United States Patent [19]

Sublett

[11] 4,398,022
[45] Aug. 9, 1983

[54] EXTRUSION BLOW MOLDABLE COPOLYESTERS

[75] Inventor: Bobby J. Sublett, Kingsport, Tenn.

[73] Assignee: Eastman Kodak Company, Rochester, N.Y.

[21] Appl. No.: 182,906

[22] Filed: Sep. 2, 1980

[51] Int. Cl.³ .................. C08G 63/16; C08G 63/18
[52] U.S. Cl. .................................. 528/302; 264/540
[58] Field of Search ........................................ 528/302

[56] References Cited

U.S. PATENT DOCUMENTS 3,935,168  1/1976  Rashbrook ..................... 528/302
4,256,860  3/1981  Davis et al. ..................... 528/302

FOREIGN PATENT DOCUMENTS 2829624  1/1980  Fed. Rep. of Germany ...... 528/302
1081144  8/1967  United Kingdom ...................... 302/

Primary Examiner—Allan Lieberman
Attorney, Agent, or Firm—John F. Stevens; Daniel B. Reece, III

[57] ABSTRACT

Disclosed are copolyesters which are capable of being extrusion blow molded into a variety of shapes such as, for example, bottles, films or the like. The copolyesters are derived from an acid component comprising terephthalic acid and 1,12-dodecanedioic acid, and a glycol component comprising 1,4-cyclohexanedimethanol.

12 Claims, No Drawings

EXTRUSION BLOW MOLDABLE COPOLYESTERS

TECHNICAL FIELD

The present invention relates to copolyesters of poly(1,4-cyclohexylenedimethylene terephthalate) modified with docecanedioic acid. These copolyesters have physical properties which permit them to be extrusion blow molded into useful articles such as films, bottles, and the like.

BACKGROUND ART

Biomedical containers, such as those used for blood and intraveneous solutions, are currently made of glass or poly(vinyl chloride). Glass is being replaced because of its weight, bulkiness, and susceptibility to breakage. Replacements for poly(vinyl chloride) are being sought because containers of poly(vinyl chloride) are made from extruded film by a rather involved process. Pellets are extruded into film, which is cut to the required sizes and two pieces are sealed on the sides and at the ends to form a bag. The bag is also fitted with one or more tubing connections. A simpler method of forming containers or bags for biomedical applications would be highly desirable. Extrusion blow molding of film or bottles provides a significant reduction in the number of steps, and consequently, the cost of producing biomedical containers. Extrusion blown film would require sealing two edges instead of four. The use of extrusion blown bottles for containers would be even simpler than using extrusion blown film because a bottle having the desired shape and openings could be blown in one step. Poly(vinyl chloride) used in many biomedical applications, such as containers for blood and intraveneous solutions, cannot be blow molded because of its high plasticizer content.

In order to take advantage of extrusion blow molding, techniques, a polymer must have sufficient melt strength to be blow moldable into an object. The polymer must have the physical, tensile, and thermal properties necessary for specific end-use applications. A polymer is described as having melt strength when it can support its own weight in the molten state after being extruded from a die. When a polymer without melt strength is melt extruded downward from a die, the melt rapidly drops and forms a thin string or breaks. Such polymers are not useful for extrusion blow molding objects. When polymers have sufficient melt strength, they can be extruded downward in the shape of a hollow cylinder. Bottles can be blown by clamping a bottle mold around the molten hollow cylinder into which air is blown to form the bottle. This process is referred to herein as "extrusion blow molding."

SUMMARY OF THE INVENTION

The present invention provides a copolyester having physical properties, including melt strength, which allow it to be extrusion blow molded into a variety of shapes such as, for example, bottles, films, or the like. The copolyesters are derived from an acid component comprising about 10–90 mol % terephthalic acid and about 10–90 mol % 1,12 dodecanedioic acid, and a glycol component comprising at least 60 mol % 1,4-cyclohexanedimethanol. The copolyester has an I.V. of from about 0.5 to about 1.8.

The acid component may include one or more acids conventionally used in the production of copolyesters such as isophthalic, oxalic; malonic; dimethylmalonic; succinic; glutaric; adipic; 2-methyladipic; trimethyladipic; pimelic; 2,2-dimethylglutaric; 3,3-diethylsuccinic; azelaic, sebacic; suberic; fumaric; maleic; itaconic; 1,2-cyclopentanedicarboxylic; 1,3-cyclopentanedicarboxylic; 1,2-cyclohexanedicarboxylic; 1,3-cyclohexanedicarboxylic; 1,4-cyclohexanedicarboxylic (hexahydroterephthalic); phthalic; 4-methylisophthalic; t-butylisophthalic; 2,5-norbornanedicarboxylic; 1,4-naphthalenedicarboxylic; 2,5-naphthalenedicarboxylic; 2,6-naphthalenedicarboxylic; 2,7-naphthalenedicarboxylic acids, dimer acid, and the like. It will be understood that the corresponding esters of terephthalic acid and the above acids, such as dimethyl esters, are included in the term "dicarboxylic acid."

The glycol component may include one or more glycols conventionally used in the production of copolyesters such as aliphatic or alicyclic diols having up to 120 carbon atoms. Examples of such diols include ethylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propane-diol; 2-ethyl-2-butyl-1,3-propanediol; 2,2-diethyl-1,3-propanediol; 2-methyl-2-propyl-1,3-propanediol; 3-ethyl-2-isobutyl-1,3-propanediol; 1,3-butanediol; 1,4-butanediol; 1,4-butenediol; 1,5-pentanediol, 1,6-hexanediol; 1,10-decanediol; 2,2,4-trimethyl-1,6-hexanediol; 1,2-cyclohexanedimethanol, 1,3-cyclohexanedimethanol, polytetramethylene glycol, polyoxyethylene glycol, polyoxypropylene glycol, polyoxybutene glycol, poly(oxyethylene-co-oxy propylene glycol) and the like. In a preferred embodiment the second diol can be ethylene glycol, 1,4-butanediol or 1,4-cyclohexanedimethanol.

The polyesters useful in this invention can be prepared by processes well known in the art. For example, the polyesters can be prepared by direct condenstion or ester interchange. Preferably the polyesters are prepared by ester interchange. According to this method, the dicarboxylic acid is reacted with an alcohol to form a diester, such as dimethyl terephthalate, and the diester is ester interchanged with a diol to form a bis ester, such as bis 2-hydroxyethyl terephthalate, and the ester interchange product is polycondensed at low pressure and high temperature to form the polyester. The reaction is allowed to continue until an I.V. of about 0.5 to 1.8 is reached.

The essential components of the copolyesters, i.e., terephthalic acid, 1,12 dodecanedioic acid and 1,4-cyclohexane-dimethanol are commercially available materials. Many of the other acids and glycols mentioned above are also commercially available.

The following examples are submitted for a better undersanding of this invention.

EXAMPLE 1

A 500-ml round bottom flask equipped with a ground glass head, a stirrer shaft, nitrogen inlet, and a side arm is charged with 97 g (0.5 mol) of dimethyl terephthalate, 115 g (0.5 mol) of 1,12-dodecanedioic acid, 79.2 g (0.55 mol) of 1,4-cyclohexanedimethanol, and 0.27 mL of a solution of titanium tetraisopropoxide in n-butanol which was 2.56% titanium. The flask is then immersed in a metal bath and heated with stirring for 2 hrs. at 220° C. with nitrogen sweeping the reaction mixture. The flask temperature is then increased to 240° C. and held at this temperature for 30 min. The metal bath temperature is then increased to 290° C., the nitrogen sweep cut off and the pressure in the flask reduced to 0.1 to 0.5 mm of mercury for 1 hr. and 15 min. The metal bath is then lowered away from the flask, the vacuum outlet clamped off, and the nitrogen inlet clamp opened to allow the flask to come to atmospheric pressure under a nitrogen blanket. The copolymer is allowed to cool and crystallize and removed from the flask. This copolymer has an inherent viscosity of 1.10.

The copolyesters of Examples 2–11 are prepared by the same general procedure as shown in Example 1, above.

Examples 2 and 3 in Table I illustrate copolyesters containing 1,12-dodecanedioic acid (30 or 40 mol %) and ethylene glycol. The melt strength of the polyester is not sufficient for extrusion blow molding because the melt strength must be 0±10%.

Examples 4 and 5 in Table I show that copolyesters which contain 100 mol % 1,4-cyclohexanedimethanol as the glycol, 50–70 mol % 1,12-dodecanedioic acid, and the remainder of the acid moiety in the copolymers is 1,4-cyclohexanedicarboxylic acid moiety do not have sufficient melt strength to be extrusion blow moldable.

Examples 6, 7, 8 and 9 in Table I show copolyesters with melt strength sufficient to be extrusion blow moldable. The copolyesters contain terephthalic acid, 1,2-dodecanedoic acid, and 1,4-cyclohexanedimethanol. These examples also show good melt strength can be obtained over a range of modifications with 1,12-dodecanedioic acid and I.V.

Example 10 in Table I shows that a mixed glycol system can also be used and still maintain sufficient melt strength to be extrusion blow moldable.

Example II in Table I shows that melt strength sufficient for extrusion blow molding can be obtained using mixed acid moieties.

These examples demonstrate that 1,12-dodecanedioic acid polymerized with dimethyl terephthalate and 1,4-cyclohexanedimethanol produces copolyesters with melt strength sufficient for extrusion blow molding, and that this system is unique in that other copolyesters (other acids and other glycols) do not have sufficient melt strength for extrusion blow molding.

Melt strength in this invention is measured by extruding the molten polymer through a die 0.1 in. in diameter and 0.25 in. long. If the extrudate is less than 1 mm in diameter, the die swell is then a negative number because there is actually no swell. If the extrudate is larger than 1 mm in diameter, the die swell is a positive number. The die swells are usually run at a shear rate of 20 sec.$^{-1}$. The die swell is expressed as a percent. It is calculated as follows using a 1-mm die.

$$\text{Melt Strength, Percent} = \frac{\text{diameter of extrudate at 6 in.} - 1}{1} \times 100$$

The term elasticity encompasses both percent die swell (0.5-in. measurement) and percent melt strength (6-in. measurement). The test is run on an Instron Rheometer using a shear rate of 20 sec$^{-1}$. Elastic melts are known to expand at the die unit during extrusion; therefore, the "pop-up" at 0.5-in. is an indication of the elasticity. Elastic melts support the weight of the extrudate to an extent depending on the elasticity. An elastic extrudate will not "draw down" under its own weight as much as one with low elasticity. The 6-in. measurement (percent melt strenght) of the extrudate that is supporting a weight of extrudate provides a measure of elasticity. Negative values mean the extrudate is smaller than the die.

For polyesters and copolyesters the percent melt strength is correlated with extrusion blow molding and, at a percent melt strength of (±10), a polyester will extrusion blow mold. Polyesters with percent melt strength out of this range will not extrusion blow mold.

The inherent viscosity of the polyester is preferably between about 0.5 and 1.8 as determined at 23° C. using 0.5 gram of polyester per 100 ml. of a solvent consisting of a 60/40 mixture of phenol/tetrachloroethane.

| Example No. | Mol % Components in Copolyester | % Melt Strength | Extrusion Temp. °C. for Melt Strength Test | Inherent Viscosity |
|---|---|---|---|---|
| 2 (Control) | 60 Mol % Dimethyl Terephthalate<br>40 Mol % 1,12-Dodecanedioic Acid<br>100 Mol % Ethylene Glycol | +32 | 170 | 1.12 |
| 3 (Control) | 70 Mol % Dimethyl Terephthalate<br>30 Mol % 1,12-Dodecanedioic Acid<br>100 Mol % Ethylene Glycol | −30 | 200 | 1.05 |
| 4 (Control) | 30 Mol % 1,4-Cyclohexanedicarboxylic Acid<br>70 Mol % 1,12-Dodecanedioic Acid<br>100 Mol % 1,4-Cyclohexanedimethanol | +53 | 100 | 1.13 |
| 5 (Control) | 50 Mol % 1,4-Cyclohexanedicarboxylic Acid<br>50 Mol % 1,12-Dodecanedioic Acid<br>100 Mol % 1,4-Cyclohexanedicarboxylic Acid | 21 | 140 | 1.13 |
| 6 | 30 Mol % Dimethyl Terephthalate<br>70 Mol % 1,12-Dodecanedioic Acid<br>100 Mol % 1,4-Cyclohexanedimethanol | −2 | 141 | 0.90 |
| 7 | 40 Mol % Dimethyl Terephthalate<br>60 Mol % 1,12-Dodecanedioic Acid<br>100 Mol % 1,4-Cyclohexanedimethanol | −2 | 141 | 0.97 |
| 8 | 50 Mol % Dimethyl Terephthalate<br>50 Mol % 1,12-Dodecanedioic Acid<br>100 Mol % 1,4-Cyclohexanedimethanol | −5 | 205 | 0.95 |
| 9 | 55 Mol % Dimethyl Terephthalate<br>45 Mol % 1,12-Dodecanedioic Acid<br>100 Mol % 1,4-Cyclohexanedimethanol | −7 | 215 | 0.93 |
| 10 | 60 Mol % Dimethyl Terephthalate<br>40 Mol % 1,12-Dodecanedioic Acid<br>80 Mol % 1,4-Cyclohexanedimethanol<br>20 Mol % Ethylene Glycol | +8 | 175 | 0.85 |

| Example No. | Mol % Components in Copolyester | % Melt Strength | Extrusion Temp. °C. for Melt Strength Test | Inherent Viscosity |
|---|---|---|---|---|
| 11 | 45 Mol % Dimethyl Terephthalate<br>15 Mol % Glutaric Acid<br>40 Mol % 1,12-Dodecanedioic Acid<br>100 Mol % 1,4-Cyclohexanedimethanol | −7 | 205 | 0.90 |

As stated previously, the acid component of the copolyester comprises about 10–90 mole % terephthalic acid and about 90–10 mole % 1,12-dodecanedioic acid. Preferably, about 40–60 mole percent of terephthalic acid and about 60–40 mole percent of 1,12-dodecanedioic acid is used.

Unless otherwise stated, all parts, percentages, ratios, etc., are on a weight basis.

The invention has been described in detail with particular reference to preferred embodiments thereof, but it will be understood that variations and modifications can be effected within the spirit and scope of the invention.

We claim:

1. Copolyester derived from
   (A) an acid component comprising about 10–90 mole % terephthalic acid and about 90–10 mole % 1,12-dodecanedioic acid, and
   (B) a glycol component comprising at least 60 mole % 1,4-cyclohexanedimethanol,
said copolyester having an inherent viscosity of about 0.5 to about 1.8 as determined at 23° C. using 0.5 gram of polymer per 100 ml. of a solvent consisting of a 60/40 mixture of phenol/tetrachloroethane, and said mole % being based on 100 mole % acid and 100 mole % glycol.

2. Copolyester derived from
   (A) an acid component comprising about 40–60 mole % terephthalic acid and about 60–40 mole % 1,12-dodecanedioic acid, and
   (B) a glycol component comprising at least 60 mole % 1,4-cyclohexanedimethanol,
said copolyester having an inherent viscosity of about 0.5 to about 1.8 as determined at 23° C. using 0.5 gram of polymer per 100 ml. of a solvent consisting of a 60/40 mixture of phenol/tetrachloroethane, and said mole % being based on 100 mole % acid and 100 mole % glycol.

3. Copolyester derived from
   (A) an acid component comprising about 40–45 mole % terephthalic acid, about 40–45 mole % 1,12-dodecanedioic acid and about 10–20 mole % of a third dicarboxylic acid,
   (B) a glycol component comprising at least 60 mole % 1,4-cyclohexanedimethanol,
said copolyester having an inherent viscosity of about 0.5 to about 1.8 as determined at 23° C. using 0.5 gram of polymer per 100 ml. of a solvent consisting of a 60/40 mixture of phenol/tetrachloroethane, and said mole % being based on 100 mole % acid and 100 mole % glycol.

4. An extrusion blow molded article of manufacture comprising the copolyester of claim 1.

5. An extrusion blow molded article of manufacture comprising the copolyester of claim 2.

6. An extrusion blow molded article of manufacture comprising the copolyester of claim 3.

7. An extrusion blow molded film comprising the copolyester of claim 1.

8. An extrusion blow molded film comprising the copolyester of claim 2.

9. An extrusion blow molded film comprising the copolyester of claim 3.

10. An extrusion blow molded container comprising the copolyester of claim 1.

11. An extrusion blow molded container comprising the copolyester of claim 2.

12. An extrusion blow molded container comprising the copolyester of claim 3.

* * * * *